Sept. 27, 1966 R. E. GELLER 3,274,851
STEERING WHEEL ASSEMBLY
Filed May 18, 1964 6 Sheets-Sheet 1

INVENTOR.
RODGER E. GELLER
BY
*Albert H. Reuther*
ATTORNEY

Sept. 27, 1966  R. E. GELLER  3,274,851
STEERING WHEEL ASSEMBLY
Filed May 18, 1964  6 Sheets-Sheet 3

INVENTOR.
RODGER E. GELLER
BY
Albert N. Reuther
ATTORNEY

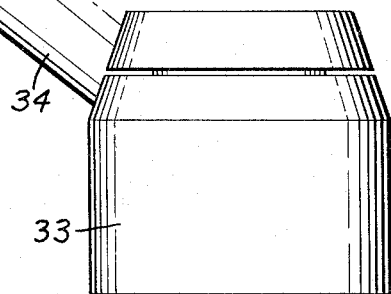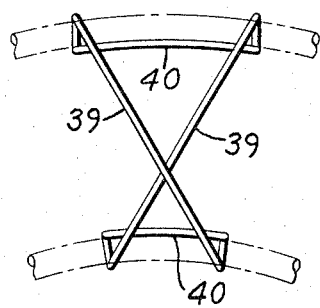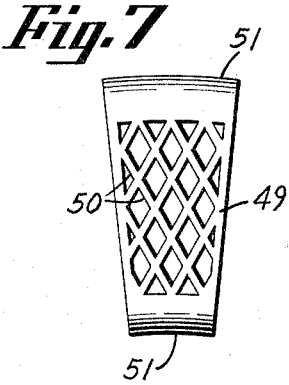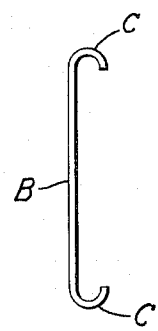

Sept. 27, 1966  R. E. GELLER  3,274,851
STEERING WHEEL ASSEMBLY
Filed May 18, 1964  6 Sheets-Sheet 5

INVENTOR.
RODGER E. GELLER
BY
*Albert W. Reuther*
ATTORNEY

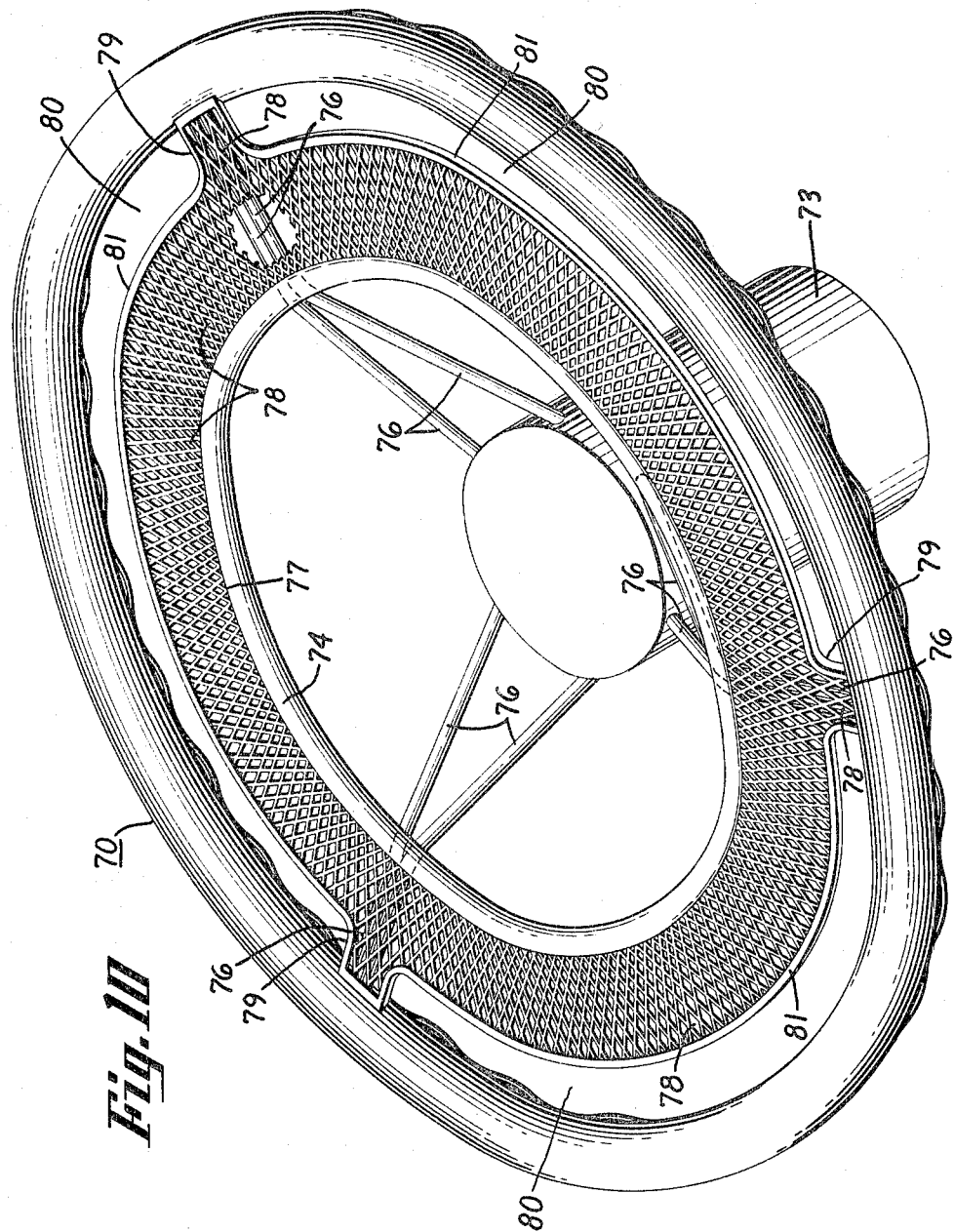

United States Patent Office 3,274,851
Patented Sept. 27, 1966

3,274,851
STEERING WHEEL ASSEMBLY
Rodger E. Geller, Dayton, Ohio, assignor to General Motors Corporation, Detroit, Mich., a corporation of Delaware
Filed May 18, 1964, Ser. No. 368,302
3 Claims. (Cl. 74—552)

This invention relates to assembly of vehicle steering wheel means and, more particularly, to arrangement of components in location intermediate rim and hub portions thereof.

Use of only flexible components per se between rim and hub portions can result in problems of twist and deformation thereof under sudden tangential or axial forces which may be applied thereto. Yet a predetermined flexibility is sought for safety reasons requiring at least partial absorption of bodily impact forces. Accordingly, an object of the present invention is to provide new and improved steering wheel assembly arrangements which assure necessary rigidity yet affording predetermined peripheral resilience for shock absorption.

Another object of the present invention is to provide a steering wheel assembly between rim and hub portions including a central rigid cage having open space for instrument visibility centrally thereof anchored by hub-supported bars extending to an intermediate loop from which resilient wiring projects peripherally to the rim portion.

Another object of the present invention is to provide a steering wheel arrangement assembled between hub and rim portions thereof with tensioned wiring, clip means, expanded metal brackets and resilient lacing means located only directly radially inwardly from the rim portion to an intermediate rigid ring member for a distance less than from the hub portion to the ring member rigidly held thereby in spaced axial relation parallel to the hub portion by spider rods in diverging relation to each other to withstand sudden turning forces.

A further object of the present invention is to provide steering wheel arrangement to include a central hub portion offset axially to one side of a pair of concentric rim portions substantially co-planar as to each other and including both resilient and rigid interconnections thereto radially outwardly from the hub portion.

Another object of the present invention is to provide a steering wheel means having both hub and rim portions in combination with an auxiliary rim portion located radially therebetween and joined by both rigid support portions carried in widely spaced positioning maintained centrally by the hub portion as well as more resilient trim means relatively close together yet deflectable under impact absorbed peripherally thereby.

Further objects and advantages of the present invention will become apparent from the following description, reference being had to the accompanying drawings wherein preferred embodiments of the present invention are clearly shown.

In the drawings:

FIGURE 4 is a cross-sectional view taken along line 4—4 in FIGURE 3.

FIGURE 5 is a plan view of alternate peripheral wiring means for use in steering wheel assembly of the present invention.

FIGURE 6 is a plan view of another resilient means of stamped metal for use in steering wheel assembly of the present invention.

FIGURE 7 is a plan view of further resilient means of expanded metal for use in steering wheel assembly of the present invention.

FIGURE 8 is a side view of configuration of resilient means such as shown by views of FIGURES 5, 6 and 7.

FIGURE 10 is a perspective view of another embodiment of steering wheel arrangement in accordance with the present invention.

Figure 1:
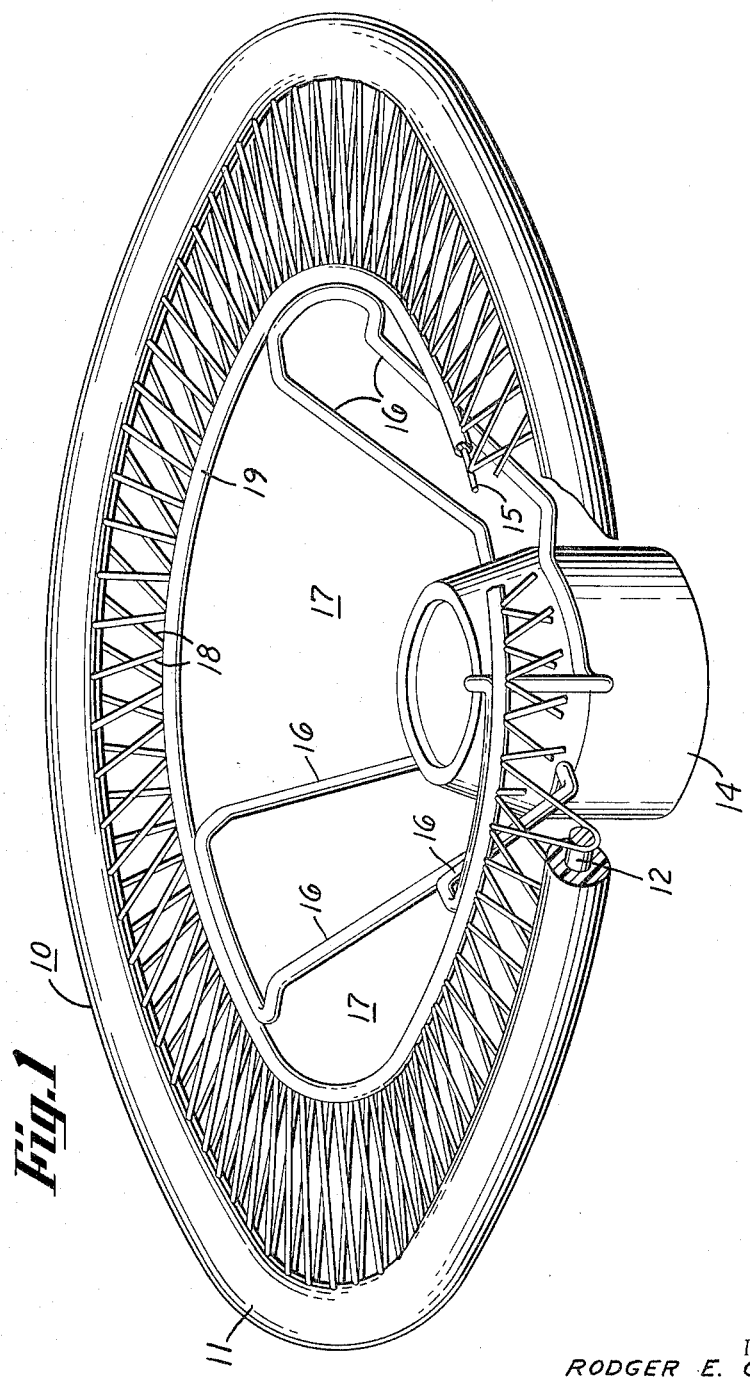
FIGURE 1 illustrates in perspective a steering wheel assembly in accordance with the present invention.

In FIGURE 1 there is a steering wheel means generally indicated by numeral 10 including a first or outer rim portion 11 having a metal core 12 therein, positioned axially to one side of and radially outwardly from a central hub portion 14. Previous attempts to improve safety features of such steering wheel means have included provision of resilient spokes or interconnections for the hub and outer rim portions which in some instances can be caused to twist or deform as to each other due to sudden turning force applied to the rim portion 11 when actually no danger or impact exists so far as harm to the body of a vehicle operator is concerned. Under such circumstances it is desirable to have a differing steering wheel arrangement provided with features in accordance with the present invention. Therefore, in FIGURE 1 there is shown a combination of intermediate components including an auxiliary rim portion 15 located radially inwardly and concentrically as to the outer rim portion 11. A limited number of relatively secure and fixed spider-like rods or supports 16 form a cage with considerable open space 17 therebetween for instrument panel visibility. Criss-crossed thin wiring means 18 can be attached between the outer metal core 12 and auxiliary or inner ring member or rim portion 15. This wiring 18 could be in tension with an angular relationship of crisscrossing wiring in a range between 15 and 30 degrees. An optional covering 19 of insulating material can be provided to conceal juncture of the wiring 18 with the ring or auxiliary rim portion 15. Thus both the rim portion 11 and covering 19 can provide ornamental effect while resilient wiring 18 assures peripheral safety subject to polishing and deflashing or molded plastic or insulating materials of the rim portion 11 and covering 19 in accordance with a teaching of a U.S. Patent 3,020,661, Miller et al. issued February 13, 1962, and belonging to the assignee of the present invention. Reference can also be made to a copending disclosure of S.N. 347,773 McCardle et al. filed February 27, 1964, and belonging to the assignee of the present invention wherein further details as to insulation coverings and finishing thereof can be found. Such vapor finishing as disclosed in Patent 3,020,661, Miller et al. dated February 13, 1962, and in the copending application permits cleaning around wiring. It is to be understood that the crisscross of wiring 18 can be reinforced or modified as shown in other views of the drawings.

Figure 2:
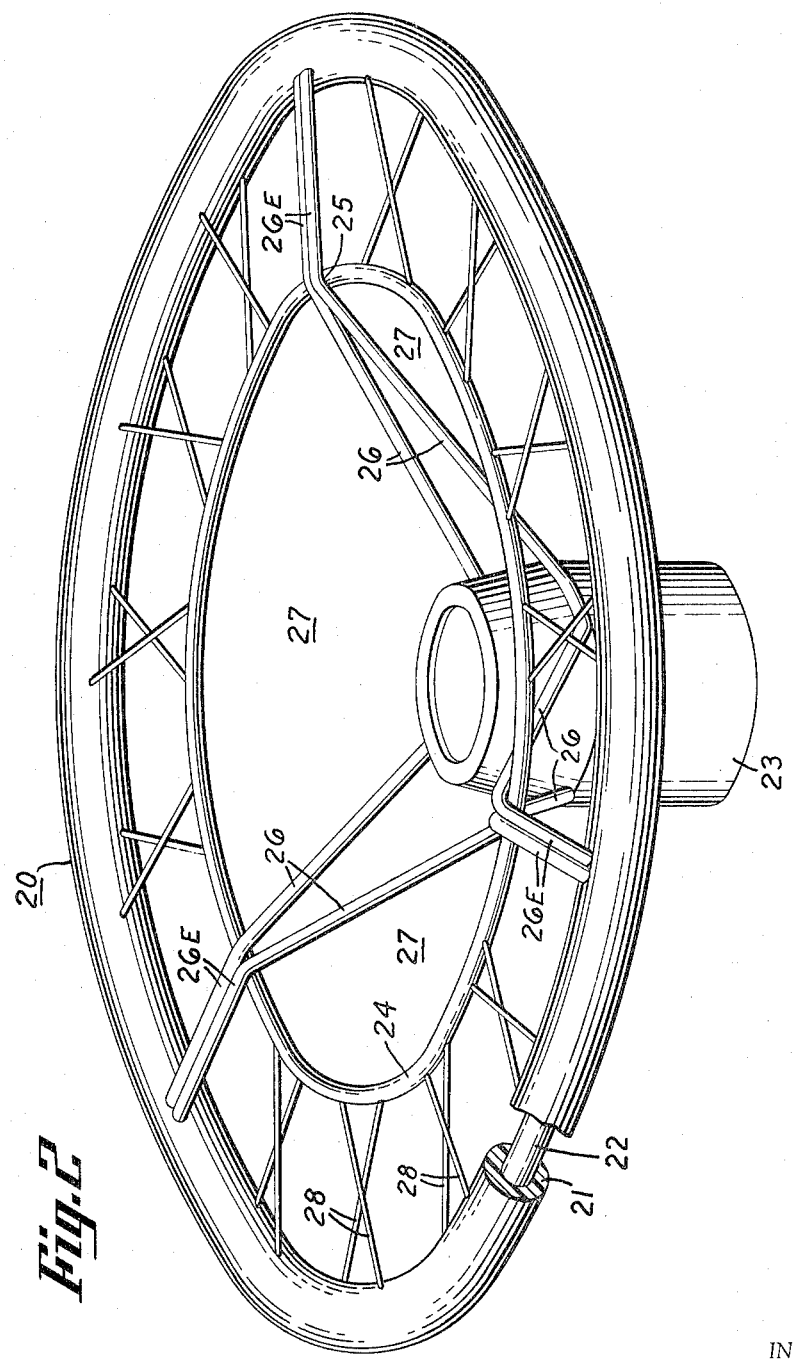
FIGURE 2 shows a perspective view of a modification of the assembly of FIGURE 1.

In FIGURE 2 there is shown another steering wheel means generally indicated by numeral 20 having a rim portion 21 of insulating material reinforced by a central core 22 located outwardly from a hub portion 23. Intermediate components in accordance with the present invention include an auxiliary ring or rim member 24 which is secured and positioned along an underside of an angular location 25 of relatively rigid rod or support means 26 having extensions 26E thereof joined to the metal core 22. In this embodiment there is still considerable open spacing 27 centrally adjacent to the hub portion 23 and the auxiliary rim or ring portion 24 though criss-cross wiring 28 is reinforced by the extensions 26E. It is to be noted that the extensions 26E can be used singly or doubly as illustrated though the double use is probably more convenient.

Figure 3:
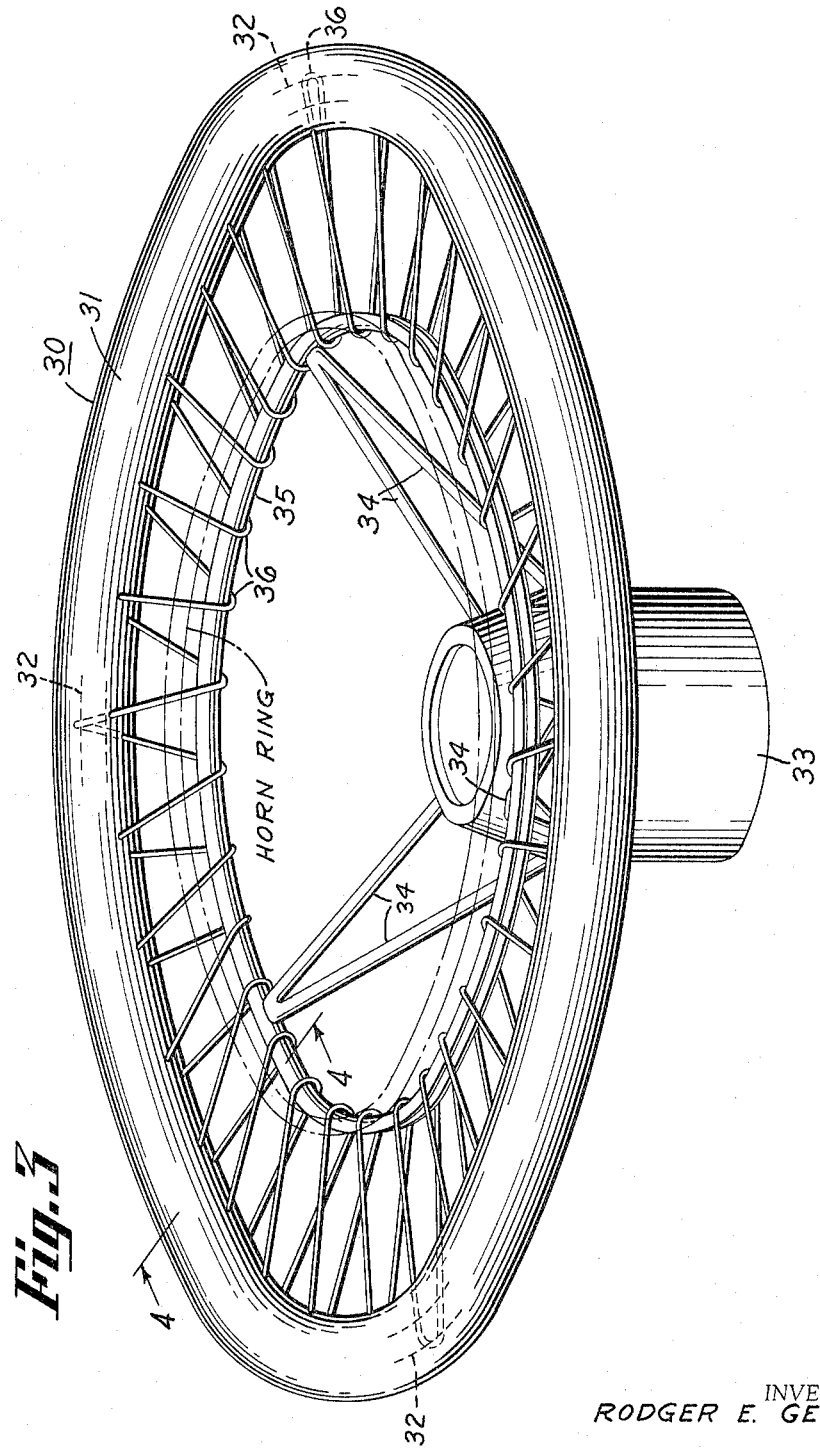
FIGURE 3 is a perspective view of steering wheel rim and hub portions having zig-zag and rigid intermediate ring means substantially in alignment with horn blowing means as carried by a central hub portion and peripheral resilient wiring means.

FIGURE 3 shows another steering wheel means generally indicated by numeral 30 having a rim portion 31 of insulating material on a metal core 32 as well as a central hub portion 33. A rigid cage-like central portion can include plural rods or support means 34 in a star-like configuration having outer ends thereof secured such as by brazing or welding to a ring member or auxiliarly rim portion 35. Resilient thin wiring means 36 can be looped or wrapped in a zig-zag configuration radially inwardly from the metal core 32. The rod or rigid support means 34 could also be a metal stamping either perforated or solid. FIGURE 4 illustrates the dished configuration of the intermediate components between the rim portion 31 and hub portion 33. It is to be noted that in cross section the auxiliary ring or rim portion 35 could be of a size or diameter less than that of the rim portion 31 so that a horn ring 37 outlined in FIGURE 4 could be located concentrically or axially in alignment on one side of the ring or auxiliary rim portion 35.

In FIGURE 5 there is an alternate showing of a wiring means with crisscross portions 39 as well as bent-over ends 40 integral therewith forming a substantially figure eight configuration. Such wiring means 39 with the bent-over ends 40 would look similar to the criss-cross wiring means 18 and 28 of FIGURES 1 and 2 and could be used conveniently in predetermined locations radially inwardly from the outer rim portion to only the intermediate or auxiliary ring means such as identified by reference numerals 15, 25 and 35 in views of FIGURES 1, 2 and 3 respectively.

FIGURE 6 shows another embodiment of intermediate components usable in place of the criss-cross wiring such as 39 and having a body portion 41 of stamped metal centrally opened as indicated at numeral 42 as well as having opposite bent-over ends 43 which fit and can be crimped over the core of the outer rim portion as well as the intermediate ring means.

In FIGURE 7 there is an illustration of another metal stamping or expanded metal means having a central body portion 49 including a plurality of openings 50 therethrough as well as bent-over ends 51. FIGURE 8 illustrates a side or elevational view of the structures of FIGURES 5, 6 and 7 arbitrarily identified by a reference "B" representing the body portions 39, 41 and 51 respectively as well as the crimped or curled ends identified by a reference numeral C in FIGURE 8 corresponding to the ends 40, 43 and 51 in FIGURES 5, 6 and 7 respectively. It is to be understood that by curling or crimping over the ends as to the core of the outer rim portion and the intermediate ring means each of the body portions is caused to be in tension. Each of the body portions is to be located substantially in a horizonal plane intermediate the core of the outer rim portion and the intermediate ring means.

It is to be noted that the intermediate ring means such as represented by reference numerals 15, 25 and 35 in views of FIGURES 1, 2 and 3 could have a semi-arcuate cross section or rolled channel metal such that wiring can terminate at radially inner ends thereof with enlarged head portions as to the intermediate ring means.

Figure 9:
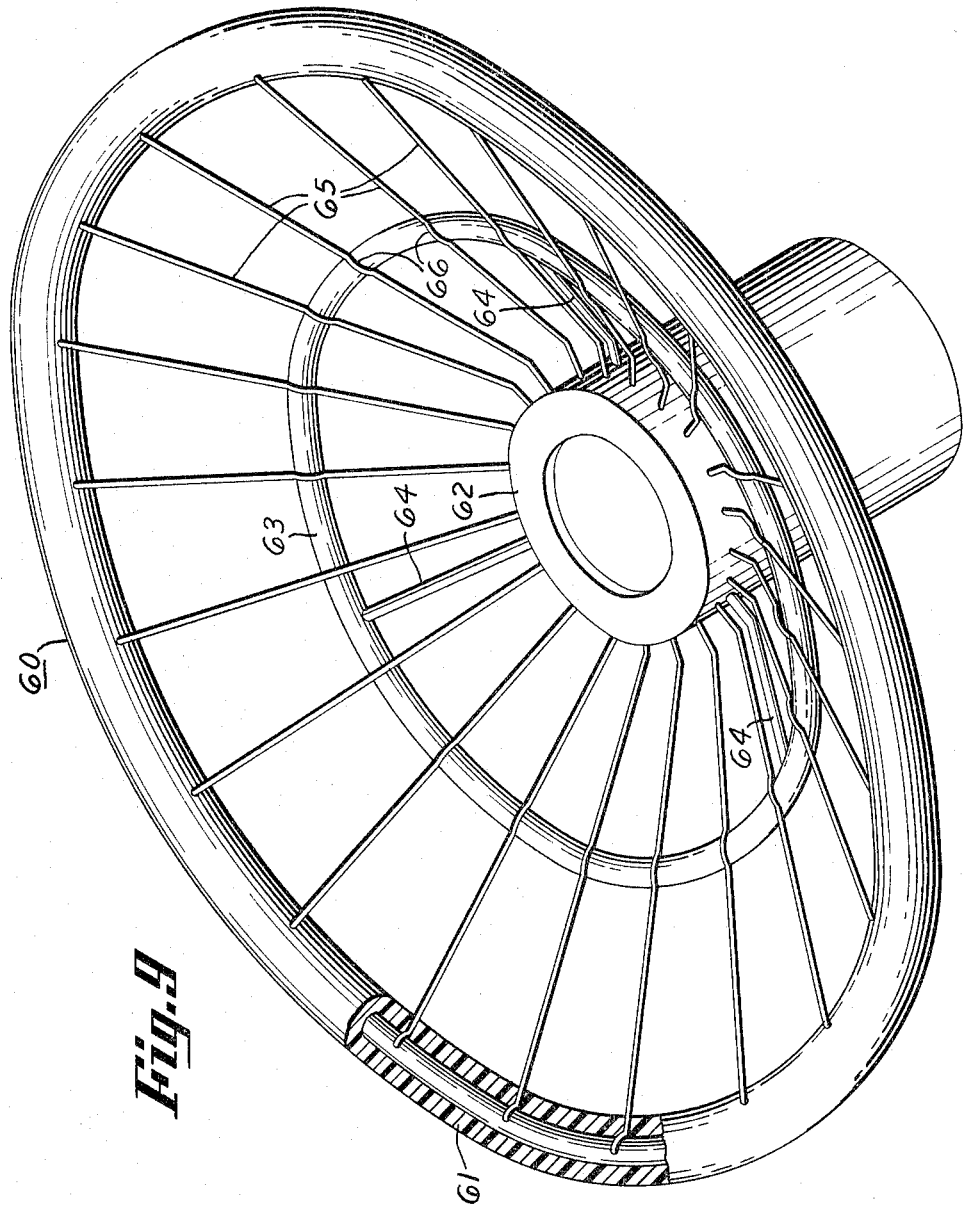
FIGURE 9 is a perspective view of another steering wheel modification.

In FIGURE 9 there is shown another steering wheel arrangement generally indicated by numeral 60 including an outer rim portion 61 as well as a central hub portion 62. Extending radially outwardly and axially to one side of the hub portion 62 there is a cage means or intermediate ring member 63 rigidly supported as to the hub portion by rods 64. However, the rods 64 are relatively few in number compared with a plurality of radially extending resilient and twin-wire means 65 which can be joined or deformed at an intermediate location 66 as to the ring means 63. Other ends of the wiring 65 can be suitably secured to the outer rim portion 61. Reference can be made to copending application S.N. 318,207, Geller filed October 23, 1963, and belonging to the assignee of the present invention concerning differing steering wheel means. Also reference can be made to copending design applications S.N. 77,115, Geller filed October 23, 1963, now Patent D. 200,636, Geller issued March 23, 1965, and S.N. 77,116, Geller filed October 23, 1963, now Patent D. 202,495, Geller issued October 12, 1965, including divisions thereof, respectively, as well as another design application S.N. 80,029, Geller filed concurrently herewith on May 18, 1964, and now Patent D. 203,499, Geller issued January 18, 1966, including divisions thereof also.

FIGURE 10 shows a perspective view of a modification in structure differing from that shown in FIGURE 2 of the drawings though including an insulated rim portion generally indicated by numeral 70 having a hub portion 73 as well as relatively rigid rod or support means 76 similar to structure designated by reference numerals 23 and 26 respectively. The extensions identified by numerals 26E in FIGURE 2 exist similarly for the structure of FIGURE 10 and are joined to a central metal core 22 having the insulation thereon. An intermediate or auxiliary ring or rim member 74 is provided for the embodiment of FIGURE 10 in a manner similar to ring or rim member 24 in FIGURE 2. However, further in accordance with the present invention a plastic annular body portion 77 having a plurality of passages 78 therethrough is provided to simulate expanded metal means though being more resilient and pliable and thus more safe in the event in impact during a collision when an operator can bodily engage the steering wheel means so equipped. The plastic body portion 77 has plural extensions 79 extending radially outwardly to cover and shield the extension of the rod or support means 76. The openings 78 can be included also in these extensions 79 thus providing a limited number of junctures of such extensions 79 which can be suitably secured or adhered adjacent to the insulating covering of the rim portion 70. The annular plastic body portion 77 can be joined suitably along an inner peripheral edge to the intermediate ring or rim member 74 and the plastic body portion per se can be premolded to the predetermined configuration which will leave semiarcuate or curved openings 80 between the rim portion 70 and an edging 81 of the plastic body portion 77. Any suitable plastic material can be used for this body portion including for example acetal resin as well as polyamide materials and the like. Also vinyl plastic material can be used in a predetermined configuration and differing color combinations can also be provided either to complement or contrast with the coloring of the insulating material on the rim portion 70 of the steering wheel means of FIGURE 10.

While the embodiments of the invention as herein disclosed constitute preferred forms, it is to be understood that other forms might be adopted.

What is claimed is as follows:

1. On a steering wheel means having a hub portion and a reinforced metal with insulation covering rim portion as well as predetermined rigid support means therebetween, an intermediate structure comprising an auxiliary ring member in a location concentrically between said hub and rim portions, and a resilient body portion of moldable plastic material having an inner periphery along said auxiliary ring member and outer edging along recessing adjacent to said rim portion except for predetermined extensions of said resilient body portion in locations over said rigid support means.

2. The intermediate structure of claim 1 wherein said resilient body portion of moldable plastic material has a plurality of crisscross junctures defining netted lattice-like openings therethrough.

3. An intermediate component arrangement for steering wheel means having a central hub portion and outer rim portion, comprising, an intermediate ring means located radially inwardly from the outer rim portion, relatively rigid support means between said ring means and hub portion, and a resilient portion interconnecting said ring means and outer rim portion, said resilient portion being made of plastic material having plural curved openings adjacent to said outer rim portion and having basket-like openings that simulate expanded metal in locations mainly adjacent to said intermediate ring means.

References Cited by the Examiner

UNITED STATES PATENTS

| | | | |
|---|---|---|---|
| D. 139,508 | 11/1844 | Snow | 74—552 |
| 258,760 | 5/1882 | Hunt | 301—54 |
| 1,179,399 | 6/1916 | Bryant | 301—55 |
| 2,683,383 | 7/1954 | Schmid | 74—552 |
| 2,765,674 | 10/1956 | Robards | 74—552 |
| 3,055,231 | 9/1962 | Daniel | 74—552 |

MILTON KAUFMAN, *Primary Examiner.*